(12) United States Patent
Sato et al.

(10) Patent No.: US 10,611,660 B2
(45) Date of Patent: Apr. 7, 2020

(54) METHOD FOR PRODUCING GLASS MATERIAL, DEVICE FOR PRODUCING GLASS MATERIAL, AND GLASS MATERIAL

(71) Applicants: NIPPON ELECTRIC GLASS CO., LTD., Otsu-shi, Shiga (JP); The University of Tokyo, Bunkyo-ku, Tokyo (JP)

(72) Inventors: Fumio Sato, Otsu (JP); Tomoko Yamada, Otsu (JP); Hiroyuki Inoue, Bunkyo-ku (JP); Atsunobu Masuno, Bunkyo-ku (JP)

(73) Assignees: NIPPON ELECTRIC GLASS CO., LTD., Shiga (JP); THE UNIVERSITY OF TOKYO, Tokyo (JP)

( * ) Notice: Subject to any disclaimer, the term of this patent is extended or adjusted under 35 U.S.C. 154(b) by 234 days.

(21) Appl. No.: 15/565,713

(22) PCT Filed: Jun. 10, 2015

(86) PCT No.: PCT/JP2015/066710
§ 371 (c)(1),
(2) Date: Oct. 11, 2017

(87) PCT Pub. No.: WO2016/199239
PCT Pub. Date: Dec. 15, 2016

(65) Prior Publication Data
US 2018/0072605 A1  Mar. 15, 2018

(51) Int. Cl.
*C03B 19/10* (2006.01)
*C03B 19/06* (2006.01)
(Continued)

(52) U.S. Cl.
CPC .......... *C03B 19/1005* (2013.01); *C03B 5/235* (2013.01); *C03B 19/063* (2013.01); *C03B 40/04* (2013.01)

(58) Field of Classification Search
CPC ..................................................... C03B 40/04
See application file for complete search history.

(56) References Cited

U.S. PATENT DOCUMENTS

2006/0026993 A1* 2/2006 Schneider ................ C03B 7/12
                                                                  65/25.1
2006/0205095 A1  9/2006 Yono et al.
(Continued)

FOREIGN PATENT DOCUMENTS

JP         2-14839 A      1/1990
JP      2000-95531 A      4/2000
(Continued)

OTHER PUBLICATIONS

JP2012017216 Machine Translation Performed by Google Aug. 26, 2019. (Year: 2019).*
(Continued)

*Primary Examiner* — Lisa L Herring
(74) *Attorney, Agent, or Firm* — Keating and Bennett, LLP

(57) ABSTRACT

Provided is a method that enables a crystal-free glass material to be stably produced by a containerless levitation technique. A glass material 30 has a first surface 31 facing a forming surface 10a and a second surface 32 located on a side opposite to the forming surface 10a. The first surface 31 includes a central portion 31a and a peripheral portion 31b located outside of the central portion 31a. Gas is jetted through a gas jet hole at a flow velocity and a flow volume at which a glass material satisfying $R_2<R_3<R_1$ is formed where $R_1$ represents a radius of curvature of the central portion 31a, $R_2$ represents a radius of curvature of the peripheral portion 31b, and $R_3$ represents a radius of curvature of the second surface 32.

3 Claims, 5 Drawing Sheets

(51) Int. Cl.
*C03B 40/04* (2006.01)
*C03B 5/235* (2006.01)

(56) References Cited

U.S. PATENT DOCUMENTS

| | | | |
|---|---|---|---|
| 2010/0003514 A1 | 1/2010 | Yono et al. | |
| 2014/0256531 A1 | 9/2014 | Endo et al. | |
| 2015/0344349 A1* | 12/2015 | Sato | ................ C03B 40/04 65/84 |

FOREIGN PATENT DOCUMENTS

| | | | | |
|---|---|---|---|---|
| JP | 2006-248801 A | 9/2006 | | |
| JP | 2009-256127 A | 11/2009 | | |
| JP | 2012-17216 A | 1/2012 | | |
| JP | 2014-196236 A | 10/2014 | | |
| JP | 2015-040145 A | 3/2015 | | |
| WO | 2008/032789 A1 | 3/2008 | | |
| WO | 2010/137276 A1 | 12/2010 | | |
| WO | WO-2014103662 A1 * | 7/2014 | ............ | C03B 40/04 |

OTHER PUBLICATIONS

Official Communication issued in International Patent Application No. PCT/JP2015/066710, dated Dec. 12, 2017 and Aug. 18, 2015.
Official Communication issued in International Patent Application No. PCT/JP2015/066710, dated Aug. 18, 2015.
Official Communication issued in corresponding Japanese Patent Application No. 2014-000770, dated May 2, 2017.

* cited by examiner

[Fig. 1]
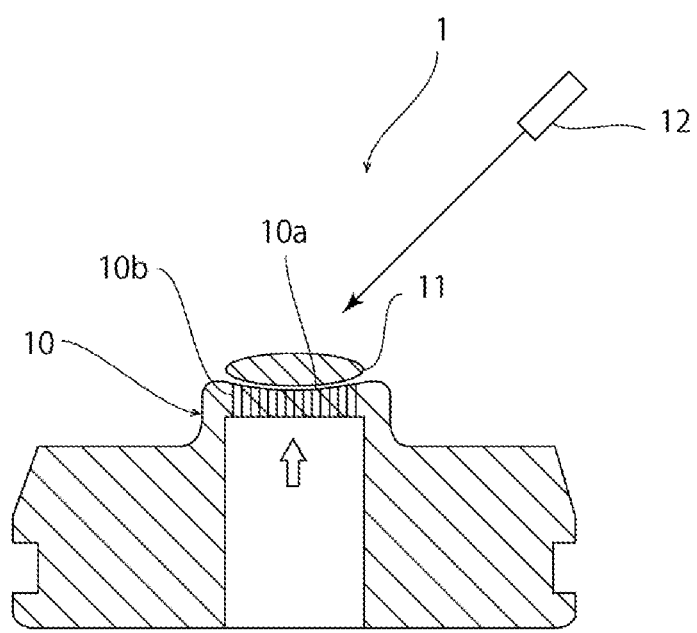

[Fig. 2]
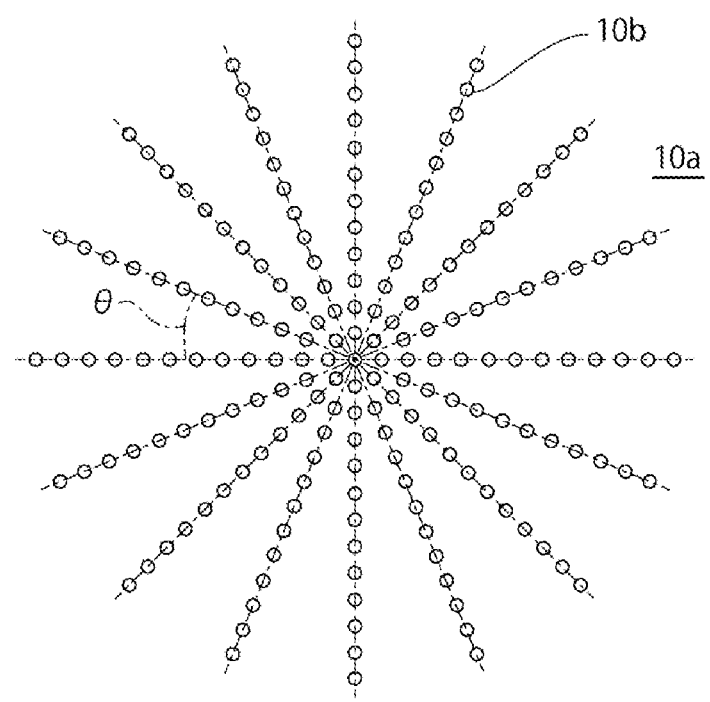

[Fig. 3]
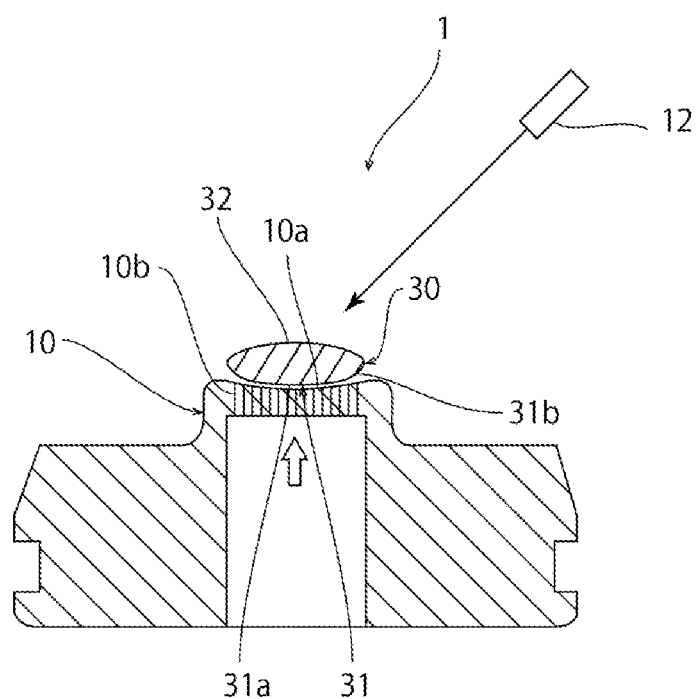

[Fig. 4]
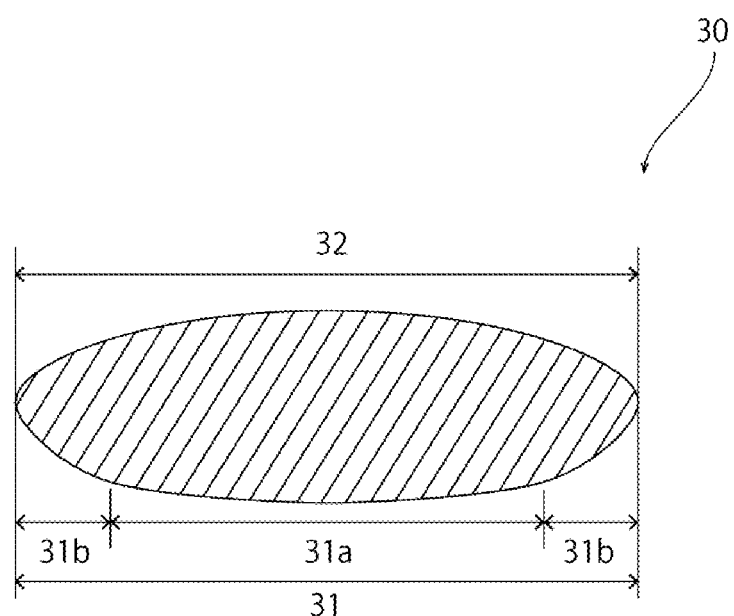

[Fig. 5]
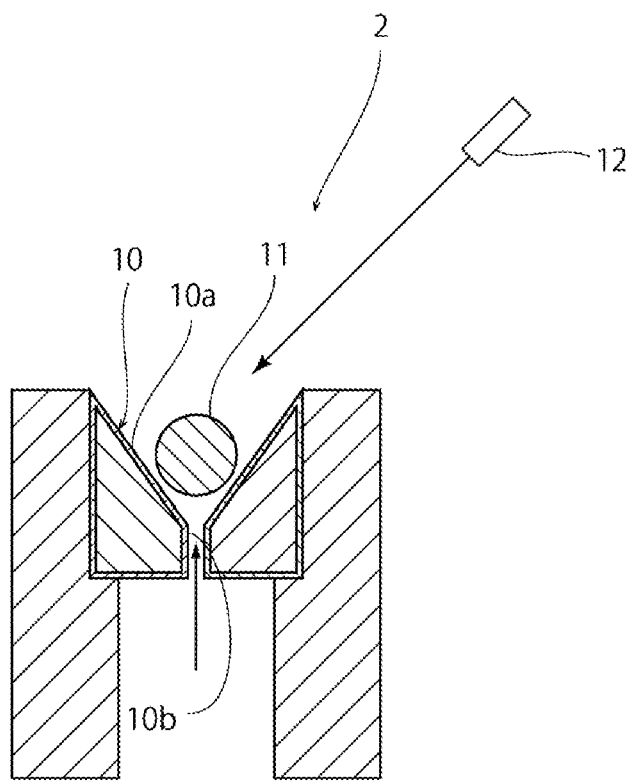

METHOD FOR PRODUCING GLASS MATERIAL, DEVICE FOR PRODUCING GLASS MATERIAL, AND GLASS MATERIAL

TECHNICAL FIELD

The present invention relates to methods for producing a glass material, devices for producing a glass material, and glass materials.

BACKGROUND ART

In recent years, studies on containerless levitation techniques as methods for producing a glass material are being conducted. For example, Patent Literature 1 describes a method for vitrifying a barium-titanium-based ferroelectric sample by heating the barium-titanium-based ferroelectric sample levitated in an aerodynamic levitation furnace to melting by irradiation with a laser beam and then cooling it. As just described, the containerless levitation techniques can reduce the progress of crystallization of a material due to contact with the wall surface of a container and, therefore, can vitrify even materials that could not be vitrified by conventional production methods using containers. Hence, the containerless levitation techniques are noteworthy as methods enabling the production of glass materials having novel compositions.

CITATION LIST

Patent Literature

Patent Literature 1: JP-A-2006-248801

SUMMARY OF INVENTION

Technical Problem

In producing a glass material by a containerless levitation technique, when a molten glass makes contact with a forming die, devitrification may occur, which makes it impossible to produce a homogeneous glass material.

A principal object of the present invention is to provide a method that enables a crystal-free glass material to be stably produced by a containerless levitation technique.

Solution to Problem

In a method for producing a glass material according to the present invention, a glass material is obtained by heating a glass raw material to melting with the glass raw material held levitated above a forming surface of a forming die by jetting gas through a gas jet hole opening on the forming surface, thus obtaining a molten glass, and then cooling the molten glass. The glass material has a first surface facing the forming surface and a second surface located on a side opposite to the forming surface. The first surface includes a central portion and a peripheral portion located outside of the central portion. The gas is jetted through the gas jet hole at a flow velocity and a flow volume at which a glass material satisfying $R_2<R_3<R_1$ is formed where $R_1$ represents a radius of curvature of the central portion, $R_2$ represents a radius of curvature of the peripheral portion, and $R_3$ represents a radius of curvature of the second surface.

A device for producing a glass material according to the present invention is a device for producing a glass material by heating a glass raw material to melting with the glass raw material held levitated above a forming surface of a forming die by jetting gas through a gas jet hole opening on the forming surface, thus obtaining a molten glass, and then cooling the molten glass. The glass material has a first surface facing the forming surface and a second surface located on a side opposite to the forming surface. The first surface includes a central portion and a peripheral portion located outside of the central portion. In the device for producing a glass material according to the present invention, the gas is jetted through the gas jet hole at a flow velocity and a flow volume at which a glass material satisfying $R_2<R_3<R_1$ is formed where $R_1$ represents a radius of curvature of the central portion of the first surface, $R_2$ represents a radius of curvature of the peripheral portion of the first surface, and $R_3$ represents a radius of curvature of the second surface.

A glass material according to the present invention is a glass material produced by heating a glass raw material to melting with the glass raw material held levitated above a forming surface of a forming die by jetting gas through a gas jet hole opening on the forming surface, thus obtaining a molten glass, and then cooling the molten glass. The glass material according to the present invention has a first surface facing the forming surface and a second surface located on a side opposite to the forming surface. The first surface includes a central portion and a peripheral portion located outside of the central portion. In the glass material according to the present invention, $R_2<R_3<R_1$ is satisfied where $R_1$ represents a radius of curvature of the central portion, $R_2$ represents a radius of curvature of the peripheral portion, and $R_3$ represents a radius of curvature of the second surface.

Advantageous Effects of Invention

The present invention can provide a method that enables a crystal-free glass material to be stably produced by a containerless levitation technique.

BRIEF DESCRIPTION OF DRAWINGS

FIG. 1 is a schematic cross-sectional view of a glass material production device according to a first embodiment.

FIG. 2 is a diagrammatic plan view of a portion of a forming surface in the first embodiment.

FIG. 3 is a schematic cross-sectional view of the glass material production device according to the first embodiment.

FIG. 4 is a diagrammatic cross-sectional view of a glass material produced in the first embodiment.

FIG. 5 is a schematic cross-sectional view of a glass material production device according to a second embodiment.

DESCRIPTION OF EMBODIMENTS

Hereinafter, a description will be given of examples of preferred embodiments for working of the present invention. However, the following embodiments are merely illustrative. The present invention is not at all limited to the following embodiments.

Throughout the drawings to which the embodiments and the like refer, elements having substantially the same functions will be referred to by the same reference signs. The drawings to which the embodiments and the like refer are schematically illustrated. The dimensional ratios and the like of objects illustrated in the drawings may be different from those of the actual objects. Different drawings may have different dimensional ratios and the like of the objects. Dimensional ratios and the like of specific objects should be determined in consideration of the following descriptions.

First Embodiment

In this embodiment, a description will be given of a method that enables suitable production of not only normal glass materials but also glass materials having compositions that could not be vitrified by melting methods using containers, such as for example compositions free from network forming oxides. According to the method of this embodiment, specifically, for example, barium titanate-based glass materials, lanthanum-niobium composite oxide-based glass materials, lanthanum-niobium-aluminum composite oxide-based glass materials, lanthanum-niobium-tantalum composite oxide-based glass materials, lanthanum-tungsten composite oxide-based glass materials, and so on can be suitably produced.

FIG. 1 is a schematic cross-sectional view of a glass material production device according to the first embodiment. As shown in FIG. 1, the glass material production device 1 includes a forming die 10. The forming die 10 has a forming surface 10a. The forming surface 10a is a curved surface. Specifically, the forming surface 10a is spherical.

The forming die 10 has gas jet holes 10b opening on the forming surface 10a. As shown in FIG. 2, in this embodiment, a plurality of gas jet holes 10b are provided. Specifically, the plurality of gas jet holes 10b are arranged radially from the center of the forming surface 10a.

The forming die 10 may be made of a porous body having interconnected cells. In this case, the gas jet holes 10b are each formed of interconnected cells.

The gas jet holes 10b are connected to a gas supply mechanism, such as a compressed gas cylinder. Gas is supplied from this gas supply mechanism via the gas jet holes 10b to the forming surface 10a. No particular limitation is placed on the type of the gas. The gas may be, for example, air or oxygen or may be inert gas, such as nitrogen, argon or helium gas.

In producing a glass material using the production device 1, first, a block 11 of glass raw material is placed on the forming surface 10a. The block 11 of glass raw material may be, for example, one obtained by forming raw material powders for a glass material in a single piece by press forming or so on. The block 11 of glass raw material may be, for example, a sintered body obtained by forming raw material powders for a glass material in a single piece by press forming or so on and then sintering the single piece. Alternatively, the block 11 of glass raw material may be, for example, an aggregate of crystals having the same composition as a desired glass composition.

No particular limitation is placed on the shape of the block 11 of glass raw material. The block 11 of glass raw material may have, for example, a lens-like, spherical, cylindrical, polygonal, cuboidal, or oval-spherical shape.

Next, gas is jetted out through the gas jet holes 10b, thus levitating the block 11 of glass raw material above the forming surface 10a. In other words, the block 11 of glass raw material is held out of contact with the forming surface 10a. In this state, the block 11 of glass raw material is irradiated with laser light from a laser applicator 12. Thus, the block 11 of glass raw material is heated to melting to make it vitrifiable, thereby obtaining a molten glass. Thereafter, the molten glass is cooled, so that a glass material 30 shown in FIGS. 3 and 4 can be obtained. During the process of heating the block 11 of glass raw material to melting and the process of cooling the molten glass and in turn the glass material at least to below the softening point, at least the jetting of gas is preferably continued to reduce the contact of the block 11 of glass raw material, the molten glass or the glass material 30 with the forming surface 10a.

In this embodiment, a description has been given of an example where the block 11 of glass raw material is heated by irradiating the block 11 of glass raw material with laser light. However, in the present invention, the method for heating the block 11 of glass raw material is not particularly limited to the method of irradiating the block 11 of glass raw material with laser light. For example, the block 11 of glass raw material may be heated by radiant heat.

The glass material 30 has a first surface 31 and a second surface 32. The first surface 31 faces the forming surface 10a during forming. The second surface 32 is located on a side opposite to the forming surface 10a during forming. Therefore, the second surface 32 is located on a side opposite to the first surface 31. The first surface 31 includes a central portion 31a and a peripheral portion 31b located outside of the central portion 31a.

The central portion 31a has a radius of curvature of $R_1$. The central portion 31a does not necessarily have to be perfectly spherical. The case where the central portion 31a is not perfectly spherical means that the radius of curvature of the central portion 31a is an equivalent radius of curvature.

The peripheral portion 31b has a radius of curvature of $R_2$. The peripheral portion 31b does not necessarily have to be perfectly spherical. The case where the peripheral portion 31b is not perfectly spherical means that the radius of curvature of the peripheral portion 31b is an equivalent radius of curvature.

The second surface 32 has a radius of curvature of $R_3$. The second surface 32 does not necessarily have to be perfectly spherical. The case where the second surface 32 is not perfectly spherical means that the radius of curvature of the second surface 32 is an equivalent radius of curvature.

Commonly, in order to prevent a large temperature deviation from occurring in the molten glass and the glass material 30, it is conceivable to lower the flow velocity of gas jetted through the gas jet holes 10b to reduce the flow volume of the gas.

Unlike the above, in this embodiment, the glass material 30 is produced while the gas is jetted through the gas jet holes 10b at a high flow velocity and a large flow volume at which a glass material 30 satisfying $R_2<R_3<R_1$ is formed. In other words, the glass material 30 is produced while the gas is jetted through the gas jet holes 10b at such a high flow velocity and a large flow volume that a portion having a smaller radius of curvature than a central portion of the first surface 31 and the second surface 32 is formed as a peripheral portion of the first surface 31. By doing so, the positional change of the block 11 of glass raw material, the molten glass, and the glass material 30 during their levitation can be reduced, so that the block 11 of glass raw material, the molten glass, and the glass material 30 can be stably levitated. Therefore, crystal formation and the like due to contact of the block 11 of glass raw material, the molten glass, and the glass material 30 with the forming surface 10a or like factors can be reduced. Hence, a crystal-free glass material 30 can be stably produced. To sum up, the glass material 30 satisfying $R_2<R_3<R_1$ can be stably produced by such a containerless levitation technique as described in this embodiment.

From the viewpoint of more stably producing the glass material 30, $R_3$ is preferably 1.05 to 3 times as large as $R_2$ and more preferably 1.1 to 2.5 times as large as $R_2$. $R_1$ is preferably 1.01 to 25 times as large as $R_3$ and more preferably 1.1 to 12 times as large as $R_3$. $R_1$ is preferably 1.1 to 50 times as large as $R_2$ and more preferably 1.5 to 25 times as large as $R_2$.

Hereinafter, a description will be given of another example of a preferred embodiment for working of the present invention. In the following description, elements having functions substantially in common with the first embodiment above will be referred to by the common reference signs and further explanation thereof will be omitted.

Second Embodiment

FIG. 5 is a schematic cross-sectional view of a glass material production device 2 according to a second embodiment.

In the first embodiment, a description has been given of an example where a plurality of gas jet holes 10b open on the forming surface 10a. However, the present invention is not limited to this configuration. For example, as in a glass material production device 2 shown in FIG. 5, a single gas jet hole 10b opening at the center of the forming surface 10a may be provided. Also in this case, like the first embodiment, the glass material 30 can be stably produced.

The present invention will be described below in further detail with reference to specific examples, but the present invention is not at all limited by the following examples, and modifications and variations may be appropriately made therein without changing the gist of the invention.

Example 1

Raw material powders were weighed and mixed and the mixture was melted at a temperature around 1300° C. and then cooled, thus producing a mass of crystals. A block of glass raw material was prepared by cutting a desired volume of piece out of the mass of crystals.

Next, using a device based on FIG. 1 and under the conditions described below, the block of glass raw material was heated to melting by irradiation with a carbon dioxide laser of 100 W power in a state where the block of glass raw material was levitated above the forming surface. Thereafter, the laser irradiation was stopped to cool the melt of the block of glass raw material. As a result, a glass material was obtained in which the diameter was 4.21 mm, $R_1$=15.9 mm, $R_2$=1.4 mm, and $R_3$=2.2 mm ($R_3/R_2$=1.57, $R_1/R_3$=7.23, and $R_1/R_2$=11.4).

Glass composition (molar ratio): $0.3La_2O_3$-$0.7Nb_2O_5$
Diameter of gas jet holes: 0.3 mm
Diameter of forming surface in plan view: 14.7 mm
Number of gas jet holes: 413
A 7.2 mm-diameter central portion of the forming surface had a configuration of gas jet holes densely arranged so that adjacent gas jet holes were equally spaced from each other, whereas gas jet holes located outside of the central portion were provided radially (angle formed by directions of rows of gas jet holes radially aligned: 11.25°, center-to-center distance between gas jet holes adjacent in the radial direction: 0.6 mm).
Percentage of area of gas jet holes to total area of forming surface: 17.2%
Flow volume of gas: 8 to 15 L/min.

Example 2

Raw material powders were weighed and mixed and the powder mixture was fired at a temperature around 1500° C. to sinter it. A block of glass raw material was prepared by cutting a desired volume of piece out of the sintered body.

Next, using a device based on FIG. 1 and under the conditions described below, the block of glass raw material was heated to melting by irradiation with a carbon dioxide laser of 100 W power in a state where the block of glass raw material was levitated above the forming surface. Thereafter, the laser irradiation was stopped to cool the melt of the block of glass raw material. As a result, a glass material was obtained in which the diameter was 6.17 mm, $R_1$=12.7 mm, $R_2$=1.8 mm, and $R_3$=3.3 mm ($R_3/R_2$=1.83, $R_1/R_3$=3.85, and $R_1/R_2$=7.06).

Glass composition (molar ratio): $0.3La_2O_3$-$0.7Al_2O_3$
Forming die: porous silicon carbide body
Diameter of forming surface in plan view: 8 mm
Central angle of forming surface: 52°
Heating temperature: 2150° C.
Flow volume of gas: 6 to 13 L/min.

Example 3

A glass material was produced in the same manner as in Example 1 except for the following conditions. As a result, a glass material was obtained in which the diameter was 2.45 mm, $R_1$=1.3 mm, $R_2$=1.0 mm, and $R_3$=1.2 mm ($R_3/R_2$=1.20, $R_1/R_3$=1.08, and $R_1/R_2$=1.30).

Glass composition (molar ratio): $0.2La_2O_3$-$0.8WO_3$
Diameter of gas jet holes: 0.1 mm
Diameter of forming surface in plan view: 6 mm
Number of gas jet holes: 185
Percentage of area of gas jet holes to total area of forming surface: 5.1%
Central angle of forming surface: 28°
Gas jet holes in the forming surface were provided radially (angle formed by directions of rows of gas jet holes radially aligned: 22.5°, center-to-center distance between gas jet holes adjacent in the radial direction: 0.2 mm).
Flow volume of gas: 0.3 to 1.1 L/min.

Example 4

Raw material powders were weighed and mixed and the powder mixture was fired at a temperature around 1000° C. to sinter it. A block of glass raw material was prepared by cutting a desired volume of piece out of the sintered body.

Next, using a device based on FIG. 1 and under the conditions described below, the block of glass raw material was heated to melting by irradiation with a carbon dioxide laser of 100 W power in a state where the block of glass raw material was levitated above the forming surface. Thereafter, the laser irradiation was stopped to cool the melt of the block of glass raw material. As a result, a glass material was obtained in which the diameter was 8.2 mm, $R_1$=42.1 mm, $R_2$=2.1 mm, and $R_3$=4.6 mm ($R_3/R_2$=2.19, $R_1/R_3$=9.15, and $R_1/R_2$=20.0).

Glass composition (molar ratio): $0.33BaO$-$0.66TiO_2$
Diameter of gas jet holes: 0.3 mm
Diameter of forming surface in plan view: 15 mm
Number of gas jet holes: 253
Percentage of area of gas jet holes to total area of forming surface: 10.5%
Central angle of forming surface: 29°
Gas jet holes in the forming surface were provided radially (angle formed by directions of rows of gas jet holes radially aligned: 11.25°, center-to-center distance between gas jet holes adjacent in the radial direction: 0.6 mm).

Flow volume of gas: 7 to 14 L/min.

REFERENCE SIGNS LIST 1, 2: glass material production device
10: forming die
10a: forming surface
10b: gas jet hole
11: block of glass raw material
12: laser applicator
30: glass material
31: first surface
31a: central portion
31b: peripheral portion
32: second surface

The invention claimed is:

1. A method for producing a glass material, the method comprising a step of heating a glass raw material to melting with the glass raw material held levitated above a forming surface of a forming die by jetting gas through a gas jet hole opening on the forming surface, thus obtaining a molten glass, and then cooling the molten glass to obtain a glass material, wherein the glass material has a first surface facing the forming surface and a second surface located on a side opposite to the forming surface, the first surface includes a central portion and a peripheral portion located outside of the central portion, and the gas is jetted through the gas jet hole at a flow velocity and a flow volume at which a glass material satisfying $R_2 < R_3 < R_1$ is formed where $R_1$ represents a radius of curvature of the central portion, $R_2$ represents a radius of curvature of the peripheral portion, and $R_3$ represents a radius of curvature of the second surface.

2. A device for producing a glass material by heating a glass raw material to melting with the glass raw material held levitated above a forming surface of a forming die by jetting gas through a gas jet hole opening on the forming surface, thus obtaining a molten glass, and then cooling the molten glass, wherein the glass material has a first surface facing the forming surface and a second surface located on a side opposite to the forming surface, the first surface includes a central portion and a peripheral portion located outside of the central portion, and the gas is jetted through the gas jet hole at a flow velocity and a flow volume at which a glass material satisfying $R_2 < R_3 < R_1$ is formed where $R_1$ represents a radius of curvature of the central portion, $R_2$ represents a radius of curvature of the peripheral portion, and $R_3$ represents a radius of curvature of the second surface.

3. A glass material produced by heating a glass raw material to melting with the glass raw material held levitated above a forming surface of a forming die by jetting gas through a gas jet hole opening on the forming surface, thus obtaining a molten glass, and then cooling the molten glass, wherein the glass material has a first surface and a second surface located on a side opposite to the first surface, the first surface includes a central portion and a peripheral portion located outside of the central portion, and $R_2 < R_3 < R_1$ is satisfied where $R_1$ represents a radius of curvature of the central portion, $R_2$ represents a radius of curvature of the peripheral portion, and $R_3$ represents a radius of curvature of the second surface.

* * * * *